May 16, 1944.  L. A. DOUGHTY  2,349,031
STORAGE BATTERY COVER
Filed Sept. 17, 1942

INVENTOR
Leon A. Doughty,
BY
Barr, Borden & Fox.
ATTORNEY

Patented May 16, 1944

2,349,031

UNITED STATES PATENT OFFICE 2,349,031

STORAGE BATTERY COVER

Leon A. Doughty, Glenside, Pa., assignor to Carlile & Doughty, Incorporated, Conshohocken, Pa., a corporation of Pennsylvania Application September 17, 1942, Serial No. 458,714

2 Claims. (Cl. 136—170)

The present invention relates to storage batteries, and more particularly to an improvement upon the battery shown and described in United States Letters Patent No. 2,021,288.

Where batteries of this type have been used in exposed locations, such as upon motorcycles, it has been found that the protruding caps for the cell filling openings, and the terminals of the battery are a hazard, since impacts or collisions damage or break them off, and besides, acts as obstructions to catch in wearing apparel. Furthermore, since the mountings for batteries are different on different makes of motorcycles, it has heretofore been necessary to manufacture several lines of batteries, differing only in the particular mounting assemblies in order to meet such conditions. Thus, a battery for one make of motorcycle cannot be replaced by a battery for a different make of motorcycle, and results in costly delays where the correct battery is not available.

Some of the objects of the present invention are to provide an improved battery assembly; to provide a battery wherein exterior protuberences and projections are eliminated; to provide a battery which is universal in so far as its cooperation with all the different types of mounting or hold-down devices used on motorcycles or other vehicles are concerned; to provide means for locating the caps for the filling openings of a battery within the projected profile of the battery case considered both vertically and horizontally; to provide means for locating the terminals of a battery within the projected profile of the battery case; and to provide other improvements as will hereinafter appear.

Figure 1:
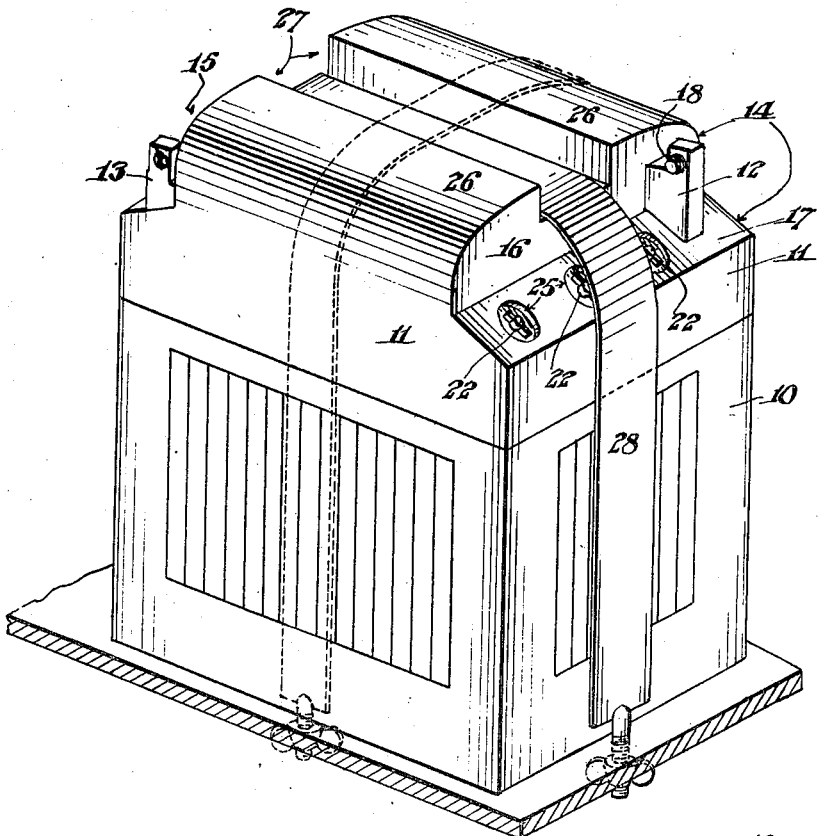
Figure 2:
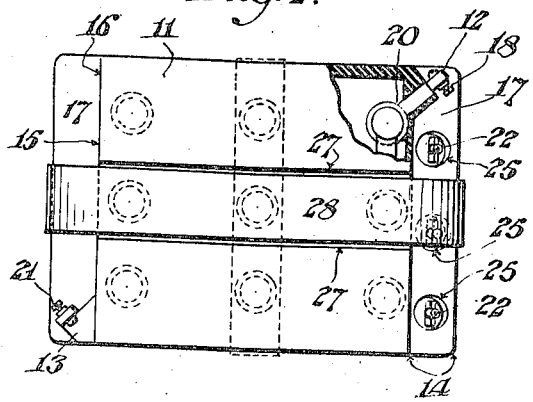
Figure 3:
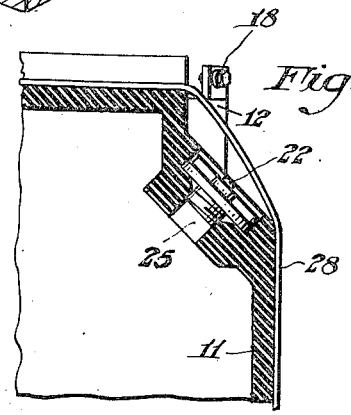

In the accompanying drawing, Fig. 1 represents a perspective of a storage battery embodying one form of the present invention; Fig. 2 represents a top plan of the same partly in section; and Fig. 3 represents a sectional detail on line 3—3 of Fig. 2.

Referring to the drawing, one form of the present invention is shown as applied to a storage battery of the usual rectangular shape consisting of a case 10 and cover 11, latter being sealed and cemented in place according to conventional practice to prevent leakage at the joints. As shown, the battery is of the three cell type having exterior positive and negative terminals 12 and 13.

In order to locate the terminals 12 and 13 within the vertical planes of the sides and ends of the battery case, that is within the rectangular profile thereof, the upper portion of the cover 11 is cut away at the ends thereof to form two transverse angular recesses 14 and 15, bounded by a vertical wall 16 and a downwardly inclined shoulder 17. The terminal 12 rises vertically from one end of the shoulder 17 to lie close to the wall 16 and within the vertical planes respectively of the sides and end of the battery boundaries. The terminal 12 carries the customary binding post 18, and has a lead 20 fused or otherwise bonded to the plates of that end cell. The other terminal 13 carries a binding post 21 and is electrically bonded to the plates of the other end cell. The plates of the intermediate cell are connected in series with the end cells as will be understood.

For the purpose of locating the caps 22, for the respective filling openings 25, below the level of the shoulder 17, the inlet of each opening 25 is counterbored to a depth equal to or greater than the length of the cap 22 and is threaded to receive such cap. The arrangement is such that when each cap is screwed into place, the top plane of the shoulder will be unobstructed by any part of the several caps. Thus with the caps in place each will lie within the vertical plane of the battery end as well as within the shoulder 17. It will be understood that each opening 25 enters its cell at such an angle as to communicate freely therewith so that each cell can be readily filled by removing its cap.

In order to provide for universal cooperation with different types of hold-down straps the top of the upstanding portion of the cover is formed on a transversely disposed convex arc 26 so that when a hold-down strap of the type to pass across the width of the battery it can do so and lie closely in contact with the aforesaid arc. Such a strap is indicated in dotted lines. It should be noted that in the provision of the curved surface the upstanding portion of the cover gives a greatly increased thickness to the cover, as compared to the ordinary battery cover, and thereby provides added resistance to rough usage. This upstanding portion is also formed with a longitudinally disposed groove 27 which is to be used when a hold-down strap of the type designed to pass lengthwise of the battery. This groove 27 is of a width to snugly receive such a strap 28, and is of a depth somewhat greater than the thickness of the strap. These straps are of conventional form terminating in threaded ends to pass through a supporting bracket and be held by suitable clamping wing nuts or the like.

It will now be apparent that a complete unitary battery assembly has been devised wherein all the usual projecting parts of a battery are now so located as to lie within the vertical bounding planes of the sides and ends of the battery. Thus, the usual exposed caps for the filling openings, while within the aforesaid planes, are also below the surface of that portion of the battery cover through which these openings pass. This construction promotes cleanliness of the cover and prevents contamination due to leakage of acid and condensation.

Furthermore, a one piece cover contoured in the manner disclosed provides a firmer support for the hold-down straps and allows the battery to better withstand rough usage. The provision of the curved top contour ensures a full gripping contact of a hold-down strap extending around the battery in the direction of its width, while the longitudinal groove serves as a seat to receive a hold-down strap extending around the battery in the direction of its length. Thus, the battery cover is universal in its application to the different types of mountings on different motorcycles or other vehicles. In case the groove is found too deep for certain installations such condition can be met by the use of shims placed between the strap and the bottom of the groove. Due to the increased thickness of the top there is an inherent reinforcement not found in the ordinary relatively thin battery covers.

Having thus described my invention, I claim:

1. In a storage battery, a cover having opposite ends cut away to form two end transverse recesses, one of said recesses having a bottom inclined upwardly from an end wall of the battery, said bottom being provided with filling openings communicating respectively with the cells of the battery, and caps removably mounted in the respective openings, said openings having a depth to locate the top face of said caps within the plane of said bottom, the portion of said cover between said recesses having a top surface curved transversely thereof and having a groove laterally thereof to seat a hold-down strap, said strap passing above said recesses in spaced relation to said caps, whereby a hold-down strap can be operatively passed about a battery in either of two directions.

2. In a storage battery, battery terminals located respectively at opposite ends thereof, a battery case, a cover therefor formed with an upstanding transverse extension having arcuate sides and a relatively deep longitudinally disposed groove paralleling said sides, said extension being lengthwise shorter than said case to provide transverse shoulders to locate the battery terminals within all plane projections of the case, one of said shoulders having filling openings for the battery cells, and a rigid hold-down strap for anchoring said battery by passing through said groove or over the arcuate sides and top of said extension.

LEON A. DOUGHTY.